(12) United States Patent
Chang et al.

(10) Patent No.: US 12,206,678 B2
(45) Date of Patent: Jan. 21, 2025

(54) NETWORK REACHABILITY SOLVING ALGORITHM BASED ON FORMAL VERIFICATION

(71) Applicant: ZHEJIANG UNIVERSITY, Zhejiang (CN)

(72) Inventors: Rui Chang, Hangzhou (CN); Yongwang Zhao, Hangzhou (CN); Zhuoruo Zhang, Hangzhou (CN); Chenyang Yu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 252 days.

(21) Appl. No.: 17/989,574

(22) Filed: Nov. 17, 2022

(65) Prior Publication Data

US 2023/0125189 A1    Apr. 27, 2023

Related U.S. Application Data

(63) Continuation of application No. PCT/CN2021/123861, filed on Oct. 14, 2021.

(51) Int. Cl.
*H04L 9/40*    (2022.01)
(52) U.S. Cl.
CPC .................................. *H04L 63/12* (2013.01)
(58) Field of Classification Search
CPC .... H04L 63/12; H04L 63/0272; H04L 63/205
See application file for complete search history.

(56) References Cited

U.S. PATENT DOCUMENTS

| | | | |
|---|---|---|---|
| 9,118,541 B2* | 8/2015 | Swallow | .................. H04L 45/03 |
| 2011/0173692 A1 | 7/2011 | Liu et al. | |
| 2016/0344772 A1* | 11/2016 | Monahan | .............. G06F 16/248 |
| 2020/0287719 A1* | 9/2020 | Hildebrand | ............. H04L 63/12 |
| 2022/0166717 A1* | 5/2022 | Pfosi | ..................... H04L 45/745 |
| 2022/0191102 A1* | 6/2022 | Yang | ..................... H04L 41/082 |
| 2023/0006915 A1* | 1/2023 | Liu | ......................... H04L 41/12 |
| 2023/0065398 A1* | 3/2023 | Purdy | ................. H04L 63/1433 |

FOREIGN PATENT DOCUMENTS

CN         112636958 A        4/2021

OTHER PUBLICATIONS

International Search Report (PCT/CN2021/123861); Date of Mailing: Mar. 28, 2022.
A-verified-capability-based-model-for-information-flow-security-with-dynamic-policies.
Research-on-k-delimited-accessibility-analysis-for-dynamic-pushdown-network.

* cited by examiner

*Primary Examiner* — Wasika Nipa
*Assistant Examiner* — Andrew Suh
(74) *Attorney, Agent, or Firm* — W&G Law Group

(57) ABSTRACT

A network reachability solving algorithm based on formal verification, which abstractly models the network reachability problem, concretely models and refines it through semantic equivalence, and implements the network reachability solving algorithm through logical equivalence transformation. With the help of formal verification tools, the present disclosure ensures the correctness and logical completeness of the reachability solving algorithm through mathematical reasoning. Compared with traditional testing-based schemes, the present disclosure guarantees the correctness and effectiveness of the network reachability algorithm based on formal method.

5 Claims, 2 Drawing Sheets

NETWORK REACHABILITY SOLVING ALGORITHM BASED ON FORMAL VERIFICATION

CROSS-REFERENCE TO RELATED APPLICATIONS

The present application is a continuation of International Application No. PCT/CN2021/123861, filed on Oct. 14, 2021, the content of which is incorporated herein by reference in their entirety.

TECHNICAL FIELD

The present disclosure relates to the field of formal methods and, in particular, to a network reachability solving algorithm based on formal verification.

BACKGROUND

With the growing maturity of the cloud computing era, Virtual Private Cloud (VPC) has recently emerged as a popular cloud service. In this virtual private cloud environment, users have high security requirements for their deployed network services. To guarantee the availability and security of VPC networks, users must ensure that the network configurations match their intended connectivity requirements.

Network reachability is specified as, "instance A can reach instance B if and only if a specific packet header sent by A can meet the IP, port and protocol restrictions imposed by network rules of all the components (e.g., security group, ACL) it passes through, and can finally reach B via a physical path in the network". The analysis of the network reachability results can clearly show the access permissions and paths of the network under the current configuration. This can help users understand whether the corresponding configuration meets the requirements and ensure the security of network configuration.

The purpose of the present disclosure is to guarantee the correctness of the network reachability solving algorithm leveraging formal method.

Currently, the challenges to be addressed in the field of network reachability detection are as follows:

(1) Traditional methods, such as network testing, reason about network reachability through enumeration, leading to unsound and time-consuming detection of configuration errors and inaccurate analysis of configuration security requirements.

(2) In recent years, with the dramatic improvement in the power of formal verification tools, there has been a surge of interest from both industry and academia in the application of formal technology to the network field. Formal method leverages mathematical techniques and thus provides strong assurance of the network's correctness or security properties, like the correctness of network configuration. However, formal verification in the network field is still in its infancy with limitations in application scope, and performance.

(a) Many network configuration models or solving algorithms are tailored to some specific types of configuration problems, such as misconfiguration in routing protocols (b) Furthermore, the tools' solving algorithms are of high time-complexity and still have significant room for improvement in terms of efficiency and scalability.

(3) However, the complexity and diversity of the network call for the performance and scalability of the network reachability algorithms. At present, networks are of high complex structures, including various entities with multiple attributes, and each entity has multi-layer nesting, intricate connectivity and constraint rules. Therefore, it is a great challenge to construct a network model that accurately covers the characteristics.

The present disclosure addresses the above challenges in both network structure modeling and verification algorithm, and obtain an efficient, formally verified reachability solving algorithm to ensure that reachability solution can be performed correctly and reliably under the current network model containing various entities, protocols and rules. Additionally, the analysis of the network reachability results can clearly show the access permissions and paths of the network under the current configuration. This can help users understand whether the corresponding configuration meets their requirements and ensure the security of the network configuration.

SUMMARY

To address the above-mentioned challenges, the purpose of the present disclosure is to provide a network reachability solving algorithm based on formal verification.

The present disclosure is realized by the following technical solution with following steps:

(1) Establishing a network model: using formal description language to specify the network model comprised of network components with complex configurations and the relationships thereof.

(2) Defining reachability semantics based on the network model: extracting the reachability property of the network model in step (1), and establishing a formal semantic model that specifies the reachability of the network model in three scenarios, i.e., the reachability between two nodes, a set of all nodes that have access to a certain node and a set of all nodes that a certain node can access.

(3) Modeling of an abstract layer of a set-based solving algorithm: obtaining an abstract formal model of set-based solving algorithm that transfers the network reachability problem into set intersection/differentiation operations of packet headers.

(4) Solving the reachability of the network model: solving the reachability of the network model obtained in step (1) by using the abstract formal model obtained in step (3) in three scenarios, i.e., the reachability between two points, the set of all nodes that have access to a certain node and the set of all nodes that a certain node can access.

(5) Proving the equivalence between the reachability result obtained in step (4) and the reachability semantics obtained in step (2). If they are not equivalent, we proceed to step (6); otherwise, we modify the abstract model until its reachability results are the same as the formal semantic.

(6) Modeling of a concrete layer of the set-based solving algorithm: the solving algorithm of the concrete layer is the refinement of the abstract model obtained in step (3); the concrete model is represented by more specified data structures and additional variables.

(7) Proving that the concrete model obtained in step (6) is a refinement of the abstract model obtained in step (3): that is, if the concrete model is a refinement of the abstract model, then proceed to the next step; otherwise, the concrete model is adjusted until the refinement relationship establishes.

(8) Deriving executable code in functional programming languages, such as Scala/Haskell/ML, from the concrete model obtained in step (7) using code generation technique supported by Isabelle/HOL tool.

(9) Obtaining a reliable and efficient solving algorithm: that is, performing logical equivalence transformation based on the executable codes obtained in step (8), using C++ programming language to develop the set-based solving algorithm, with optimizations in time complexity and space complexity.

Further, in step (1), the network model satisfies the functional requirements (i.e., expected data structure of each entity) declared in the specification document.

Further, the reachability solving result in step (4) is to answer a query in one of the three scenarios: for the reachability between two nodes, it returns the reachable Boolean result, the reachable path and the reachable packet header set; for the reachability between multiple nodes, it returns the complete set of instances in the VPC networks accessible by a certain node.

Further, in step (5), the semantic equivalence of reachability means that for the reachability between two nodes, two nodes A and B are reachable in the formal semantic model if and only if the solving result of the abstract algorithm model is reachable, and for the reachability between multiple points, the two models obtain exactly the same set of nodes and the identical corresponding set of packets that are reachable.

Further, the executable code in step (8) includes Scala, Haskell, ML, etc.

The present disclosure has the following beneficial effects: the present disclosure provides a high-credibility reachability solving algorithm aiming at the security problem of network reachability that needs to be solved urgently in the industry; the algorithm has low time and space complexity, and mathematical reasoning is used in Isabelle, a formal verification tool, to prove the equivalence between the reachability result of the algorithm and the reachability semantics of the original network model, thus ensuring its correctness and logical completeness; in the current study, there is no relevant content to prove the equivalence between the reachability of the solving algorithm and the network reachability; compared with the traditional test case coverage solution, the present disclosure makes a more significant and effective formal verification of the network model security; the formalization method based on theorem proving of the present disclosure is not limited to finite state space or certain types of properties to be verified, so it can be applied to describe large-scale networks, can verify multiple properties at the same time, and has high expansibility and reusability.

DESCRIPTION OF EMBODIMENTS

As one of the popular cloud services, Virtual Private Cloud (VPC) provides a private, user-configured and managed virtual network environment for cloud servers, cloud databases and other resources. VPC simplifies user network configuration steps and improves network isolation. In order to make the purpose and effect of the present disclosure clearer, we elaborate on detailed embodiments of the present disclosure with reference to the drawings and preferred embodiments taking VPC as an example of network environment. We note that the specific embodiments described here are only for explaining the present disclosure, but not for limiting the present disclosure.

Figure 1:
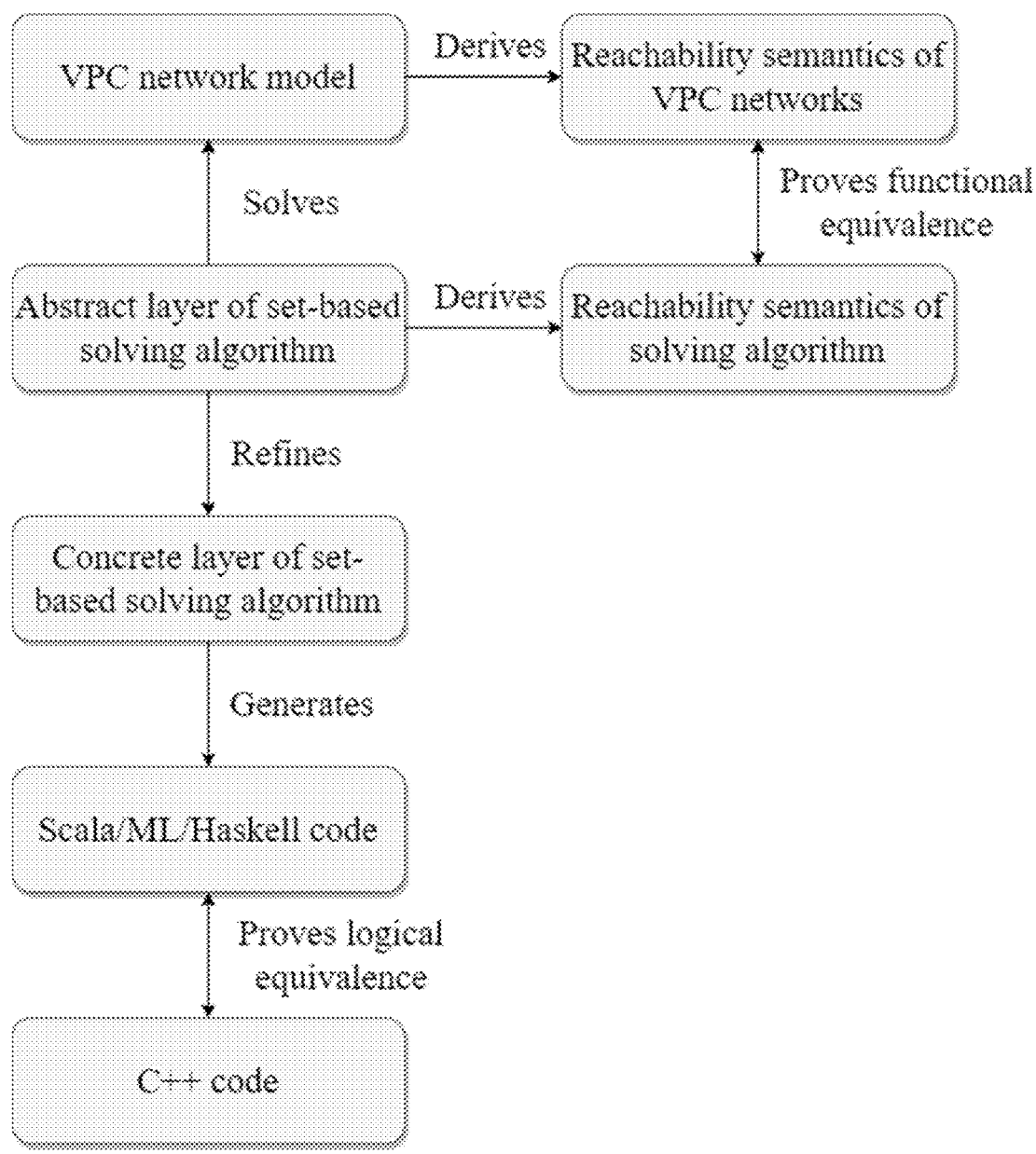
FIG. 1 is the workflow of the present disclosure.
Figure 2:
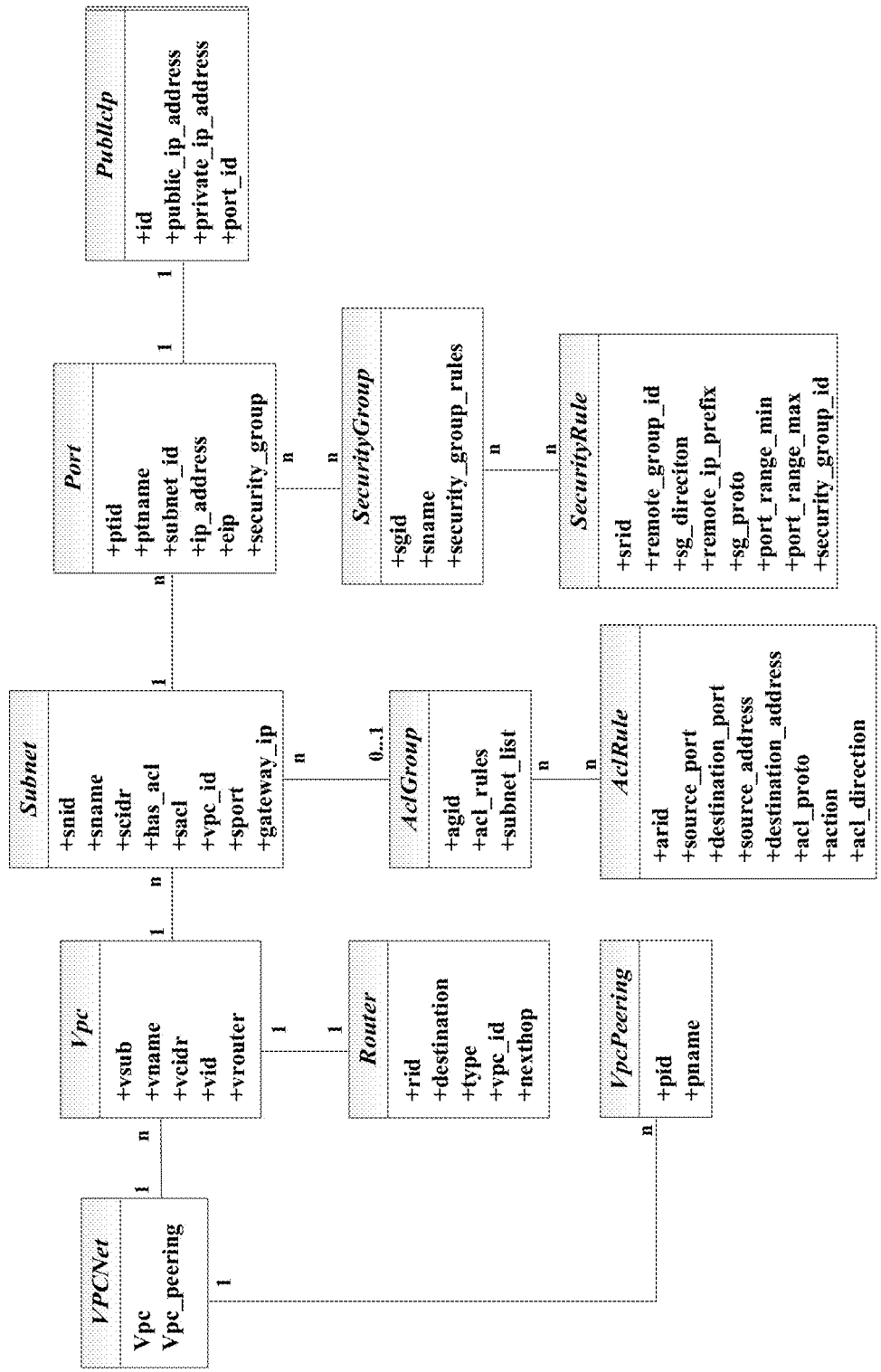
FIG. 2 shows key entities in VPC as a preferred example.

With reference to FIG. 1 and FIG. 2, an embodiment of the present disclosure provides a VPC-specific reachability solving algorithm based on formal verification, which includes the following steps:

(1) Establishing a virtual private cloud network model: namely using formal description language to specify the VPC network model comprised of various entities and their relationships.

As shown in FIG. 2, different entities jointly form a virtual private cloud network model (VpcNet)

Formal description language is adopted to describe the data structure, attribute fields of each entity of the virtual private cloud network model and the relationship between different entities. Specifically, key networking components are as follows:

(a) Virtual Private Cloud (VPC): each VPC contains 1-n subnets and a virtual routing table; different VPCs can communicate with each other through vpc peering.
(b) Subnet: it is attached to 0-n access control lists (AclGroup), and contains 0-n network interfaces.
(c) Access control list (AclGroup): act on multiple subnets at the same time and contains multiple ACL rules (AclRules); an ACL rule involves two directions, i.e., in and outgoing, and contains restrictions on the packet header fields (source port, destination port, source address, destination address, and protocol) to allow/deny it to pass through.
(d) Security group: a security group acts as a virtual firewall with various security group rules (SecurityRules), for instance to control inbound and outbound traffic.
(e) Routing table: A routing table contains a set of rules, called routes, that are used to determine where network traffic is directed. Each route in a table specifies a destination CIDR and a nexthop.
(f) Network interface: A network interface is a logical networking component in a VPC that represents a virtual network interface. It can have a private IP address and can be attached to or detached from an instance.
(g) Public network IP: one-to-one binding with the network interfaces.
(h) Vpc peering: A VPC peering connection enables the full sharing of resources between the two connected VPCs.

The VPC network model satisfies the functional requirements (i.e., expected data structure of each entity) declared in the specification document.

(2) Defining reachability semantics based on the network model: extracting the reachability property of the network model in step (1) and establishing a formal semantic model that specifies reachability of the network model in three scenarios, i.e., the reachability between two nodes, the set of all nodes that have access to a certain node and the set of all nodes that a certain node is capable of accessing.

The semantics of network reachability is defined according to the entities of the VPC network in step (1), and by combining the restrictions specified by the rules of the security groups, ACLs and the routing tables on reachability; the semantics of network reachability is the reachability solving result in the virtual private cloud network model, including the reachability between two nodes, the set of all nodes that have access to a certain node, and the set of all nodes that a certain node can access.
- (a) For a specific instance A, whether another instance B is reachable. B can either be from the internet, from other components in the VPC, or from other components in a different VPC via a peering connection.
- (b) For a specific instance A, get the complete set of instances that have access to A. For instance, a server A in VPC stores important data and is expected to be accessible only by the internal network. Thus, check whether A can be accessed from the remote public network.
- (c) For a specific instance A, get the complete set of instances that A can access. For instance, a server A in VPC has been infected by malicious software through a certain port, confirm the scope of devices that A can infect.

(3) Modeling of an abstract set-based solving algorithm: obtaining an abstract formal model of set-based solving algorithm that transfers the network reachability problem into set intersection/differentiation operations of the packet headers.

(4) Solving the reachability of the network model: solving the reachability of the network model obtained in step (1) by using the abstract formal model obtained in step (3) in three scenarios, i.e., the reachability between two points, the set of all nodes that have access to a certain node and the set of all nodes that a certain node can access.

Take the reachability between two nodes as an example, given the starting node, the end node, the network interfaces and protocol ranges of the two nodes, we first obtain the intersected set of the restriction rules of the security group, ACL and routing table along the path that connects the two nodes Note that the set is the passable packets along the whole path and thereby a non-empty set indicates that there are passable packets between the two nodes. Therefore, the returned result between two nodes is the Boolean reachability result, the set of all passable packets and the reachable path between the two nodes. For the set of nodes that have access to a certain node and the set of all nodes that a certain node can access, we obtain the set of nodes satisfying the reachable constraints and the set of corresponding reachable packets for each node.

(5) Proving the equivalence between the reachability result obtained in step (4) and the reachability semantics obtained in step (2). If they are not equivalent, we proceed to step (6); otherwise, we modify the abstract model until its reachability results are the same as the formal semantic.

The two models are equivalent if they yield equal results given equal arguments. In this way, we have the confidence that our algorithm is implemented correctly. More specifically, the reachability equivalence means that for the reachability between two nodes, two nodes A and B are reachable in the formal semantic model if and only if the solving result of the abstract algorithm model is reachable; for the reachability between multiple nodes, the two models obtain exactly the same set of nodes and the identical corresponding set of packets that are reachable Equivalence proof idea: a hierarchical idea is adopted, i.e., firstly, we facilitate the equivalence proof of each single constraint entity (i.e., access control list, security group or router) in two models, respectively. Then, we further extend equivalence relation to the intersection of different constraint entities.

(6) Modeling of a concrete set-based solving algorithm: the concrete solving algorithm is a refinement of the abstract model obtained in step (3); the concrete model is represented by more specified data structures and additional variables (7) Proving that the concrete model obtained in step (6) is a refinement of the abstract model obtained in step (3): that is, if the concrete model is a refinement of the abstract model, then proceed to the next step; otherwise, the concrete model is adjusted until the refinement relationship establishes.

The essence of proof: if the concrete model is a refinement of the abstract model, the current set-based reachability solving algorithm is verified; otherwise, the concrete model of the set-based solving algorithm is adjusted until the refinement relationship establishes.

(8) Deriving executable code in functional programming languages, such as Scala/Haskell/ML, from the concrete model obtained in step (7) by using code generation technique supported by Isabelle/HOL tool.

The Isabelle/HOL code generation method includes the following four steps:
- (a) Generating a collection of (raw) code equations from an Isabelle theory file through specification tools or explicit proof by users.
- (b) Using a preprocessor to transform the theorem of the raw code equations to generate a structured collection of code equations.
- (c) Translating the code equations into an abstract intermediate language, which contains four statements: data (for data type), fun (stemming from code equations), class and inst (for type classes).
- (d) Serializing the abstract intermediate program into executable codes of target languages such as Scala, Haskell or ML; this step only produces concrete syntax but does not change the program in essence, thus can ensure that the reachability semantics remain unchanged before and after the transformation (9) Obtaining a reliable and efficient solving algorithm as a prototype: performing logical equivalence transformation based on the executable codes obtained in step (8), using C++ programming language to develop the set-based solving algorithm, with optimizations in time complexity and space complexity. We leverage the prototype to solve the network reachability problem with dataset of different scales. The result shown as follows demonstrate that the prototype has high efficiency and scalability:

TABLE 1

| VPC network test data scale | | | | | | |
|---|---|---|---|---|---|---|
| | specific data | | | | | |
| VPCN network Scale | Number of VPC nodes | The average number of subnets | Number of network interfaces | The average number of security groups | The average number of ACLs | Peer connection coverage |
| Small | 10 | 2 | 200 | 5 | 5 | 0.3 |
| Middle | 100 | 2 | 2000 | 10 | 10 | 0.3 |
| Big | 1000 | 3 | 20000 | 20 | 20 | 0.3 |

TABLE 2

Solving time of set-based solving algorithm for VPC networks

| | | Case | |
|---|---|---|---|
| | Running time | Solving reachability between two nodes | Solving the set of all nodes accessible for a certain node |
| Small | Construction time of VPC graph(s) | 0.004752159118652344 | 0.005861997604370117 |
| | Reachability solving time (s) | 0.00009288787841796876 | 0.0005300045013427734 |
| Middle | Construction time of VPC graph(s) | 0.08800172805786133 | 0.06298446655273438 |
| | Reachability solving time (s) | 0.0000852346420288086 | 0.0010781288146972656 |
| Big | Construction time of VPC graph(s) | 1.0768859386444092 | 0.005861997604370117 |
| | Reachability solving time (s) | 0.00012922286987304688 | 0.0005300045013427734 |

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive). It can be understood by those skilled in the art that the above examples are only preferred examples of the present disclosure, and are not intended to limit the present disclosure. Although the present disclosure has been described in detail with reference to the above-mentioned examples, it is still possible for those skilled in the art to modify the technical solutions described in the above-mentioned examples or equivalently replace some of the technical features. Modifications and equivalents substitutions made within the spirit and principle of the present disclosure shall be included in the scope of protection of the present disclosure.

What is claimed is:

1. A system for network reachability solving algorithm based on formal verification, comprising:
   a memory; and
   one or more hardware processors coupled to the memory, the one or more hardware processors being configured to perform operations comprising:
      establishing a network model: using formal description language to specify the network model comprised of network components with complex configurations and relationships of the network components;
      defining reachability semantics based on the network model: extracting a reachability of the network model and establishing a formal semantic model that specifies reachability of the network model in three scenarios including a reachability between two nodes, a set of all nodes that have access to a certain node and a set of all nodes that a certain node is capable of accessing;
      modeling an abstract layer of a set-based solving algorithm: obtaining an abstract formal model of the set-based solving algorithm that transfers network reachability problem into set intersection/differentiation operations of packet headers;

solving the reachability of the network model: solving the reachability of the network model using the abstract formal model obtained in three scenarios, including, the reachability between two nodes, the set of all nodes that have access to a certain node and the set of all nodes that a certain node is capable of accessing;

proving an equivalence between a reachability result and the reachability semantics, wherein when the reachability result and the reachability semantics are not equivalent, modifying an abstract model until the reachability results obtained by the formal semantic model is the same as the abstract model;

when the reachability result and the reachability semantics are equivalent, modeling a set-based concrete solving algorithm, wherein the concrete solving algorithm is a refinement of the abstract model, and a concrete model is represented by more specified data structures and additional variables;

proving that the concrete model is the refinement of the abstract model, wherein when the concrete model is not the refinement of the abstract model, the concrete model is adjusted until the concrete model is the refinement of the abstract model;

when the concrete model is the refinement of the abstract model, deriving executable code in functional programming languages from the concrete model using code generation technique supported by Isabelle/higher-order logic (HOL) tool; and obtaining a reliable and efficient solving algorithm: that is, performing logical equivalence transformation on the executable code using C++ programming language to develop the set-based solving algorithm, and solving the reachability of the network model with optimization in time complexity and space complexity.

2. The system according to claim 1, wherein the network model satisfies a functional requirement declared in the specification document, and wherein the functional requirement comprises expected data structures of each entity.

3. The system according to claim 1, wherein the reachability result is to answer a query in one of the three scenarios: for the reachability between two nodes, it returns a reachable Boolean result, a reachable path and a reachable packet header set; for a reachability between multiple nodes, it returns a complete set of instances in Virtual Private Cloud (VPC) networks accessible by a certain node.

4. The system according to claim 1, wherein the equivalence between the reachability result means that for the reachability between two nodes, two nodes A and B are reachable in the formal semantic model when and only when a solving result of the abstract algorithm model is reachable; for a reachability between multiple nodes, the formal semantics model and abstract algorithm model obtain exactly a same set of nodes and an identical corresponding set of packets that are reachable.

5. The system according to claim 1, wherein the executable code comprises Scala, Haskell or Machine Learning (ML).

* * * * *